July 21, 1959 W. G. MEYER ET AL 2,895,776
ADJUSTABLE EXTENSION ARM
Filed Feb. 14, 1958
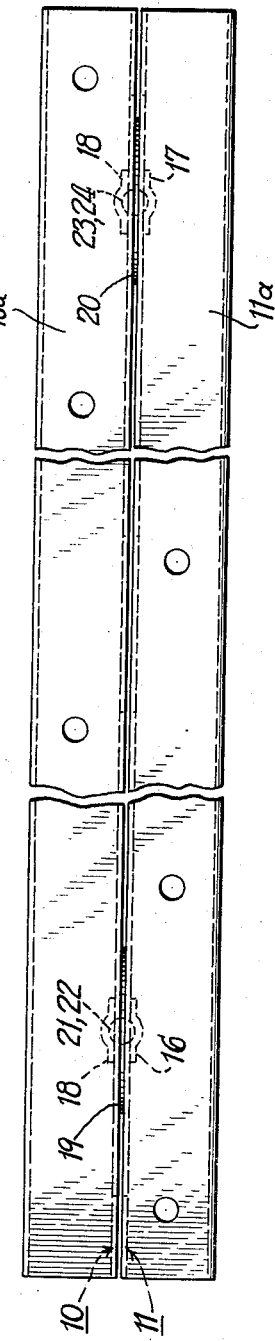
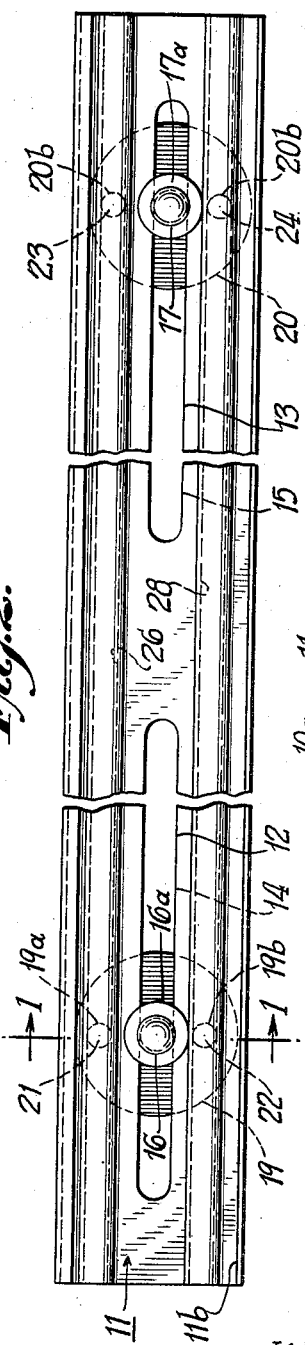
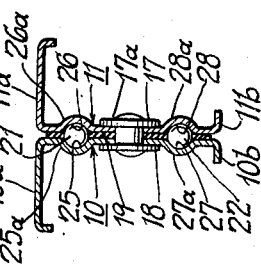
INVENTORS.
WILLIAM G. MEYER.
BY MORRIS MANSON.
ATTORNEYS.

United States Patent Office 2,895,776
Patented July 21, 1959

2,895,776

ADJUSTABLE EXTENSION ARM

William G. Meyer, Clifton, N.J., and Morris Manson, Great Neck, N.Y., assignors to Steel Slides, Inc., Yonkers, N.Y., a corporation of New York Application February 14, 1958, Serial No. 715,462

6 Claims. (Cl. 311—71)

This invention relates to extension arms, and more particularly to such arms having a plurality of slide elements which may move longitudinally relative to one another thereby to extend the extension arm, the construction being particularly adapted to such arms for furniture, such as tables, thereby to permit easy separation of portions thereof to permit the insertion of extra leaves in the table.

The invention in one aspect thereof is constituted by a pair of elongated slide elements generally of strip-like configuration, each having a flange formed along the opposite edges thereof which when the elements are in vertical attitude comprise upper and lower flanges for the purpose of providing added strength thereto. Each slide element thus in transverse cross-section is somewhat in the shape of a channel member, one of which may extend perpendicularly from the bottom of the channel a somewhat greater distance than the other. The longer of the two flanges may be employed for securing same to the underside, for example, of a table. Each of the two slide elements is provided with a pair of aligned longitudinally extending slots, preferably one near each extremity thereof. When the two slide elements are placed side by side with the extension arm in an unextended condition the slots are in register. The slide elements are held together by means of a pair of fasteners, one extending through each pair of side-by-side slots. Each of such fasteners may, for example, comprise a rivet passing through such side-by-side slots and to which rivet are secured washers of suitable diameter on opposite side faces of the two-element extension arms thereby to hold together the slide elements thereof. The slide elements are given greater strength and may be moved relative to one another with greater facility by virtue of a groove and ball bearing construction comprising the following: Formed along one side of such aligned longitudinally extending slots and in face-to-face relation with one another are two grooves (one in each slide element), each of substantially semicircular cross-section, the two grooves being adapted for receiving therebetween a pair of spherical balls, one for movement in the neighborhood of the slot at one end of the extension arm and another in the neighborhood of the slot at the opposite end. Formed along the other side of such aligned slots are two additional grooves, parallel to the first two grooves and of analogous conformation, such two grooves also having therebetween, and hence between the two slide elements, two additional pairs of spherical balls. Thus two pairs of such balls are provided, namely, a first pair for movement adjacent one of the slots, and a second for movement adjacent the other of such slots. Each pair of spherical balls is held in position with one ball on one side and another ball on the other side of its respective pair of side-by-side slots by means of a disc interposed between the two slide elements, which disc is provided with a pair of circular recesses for receiving respective of the spherical balls. The combined structure, by virtue of the coaction of the balls and grooves and the fastening means, together with the aforementioned discs, provide a two-slide element extension arm of superior strength and superior ease of operation and also one of extraordinary low cost as compared to analogous structures of the prior art.

One of the objects of the present invention thus is to provide an extension arm of extreme simplicity in construction and low cost while at the same time providing high rigidity and strength.

A further object is to provide an extension arm of the aforementioned character which is well adapted for mass production techniques, the parts thereof being able to be formed substantially without any machining operations.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention, reference for this latter purpose being had primarily to the appended claims.

In the drawings:

Fig. 1 is a vertical cross-section, partly in section and with parts broken away, of an extension arm embodying the present invention;

Fig. 2 is a side elevation, with parts broken away, of the construction shown in Fig. 1; and Fig. 3 is a top plan view, also with parts broken away, of the extension arm of Fig. 2.

Referring to the drawings, a pair of slide elements 10 and 11, shown in cross-section in Fig. 1, are provided which are identical and which are provided respectively with upper and lower flanges 10a, 10b and 11a, 11b. The elements 10 and 11 initially are formed of any suitable metal, for example, sheet steel.

Formed in the slide element 10 is a pair of aligned slots 12 and 13 (Fig. 2) which extend longitudinally of such element, one slot being near one extremity thereof and the other near the opposite extremity. The other slide element 11 also has formed therein an analogous pair of slots 14 and 15 which are respectively in register with the first pair of slots when the extension arm is in its retracted or collapsed condition, as shown in Figs. 2 and 3. Slides 12, 14, or portions thereof, are at all times side-by-side. Slides 13, 15 are in similar relation to one another. Such pairs of slots 12, 13 and 14, 15 move out of register in response to the extension of the extension arm, namely, in response to relative movement of the slide elements 10 and 11. Such two slide elements 10 and 11 are held together by any suitable fastening means which pass through the adjacent pairs of slots 12, 14 and 13, 15. For example, the slide elements are held together by a pair of rivets 16 and 17 respectively passing through the pairs of slots 12, 14 and 13, 15. The rivets 16 and 17 are provided with broad heads 16a and 17a respectively (or with washers of suitable diameter held in place by a smaller rivet head) which heads (16a, 17a) are of substantially greater diameter than the width of their respective slots through which the rivets pass. To the opposite end of each rivet there is secured a suitable washer, such as 18 (Fig. 1), also of a diameter substantially greater than the width of its respective slot 12 and 13 whereby the two slide elements are held in face-to-face relationship as shown in Fig. 1.

Interposed between the adjacent faces of the slide elements 10 and 11 are the ball positioning or retaining elements, in the form shown, discs 19 and 20 which are coaxial respectively with the rivets 16 and 17 and each of which serves the function of holding in position a pair of ball bearings, one above and one below its respective pair of slots (12, 14 and 13, 15) as viewed in Fig. 2. The disc 19 for this purpose is provided with perforations or holes 19a and 19b for receiving ball bearings 21 and 22 respectively.

Similarly the disc 20 is provided with perforations or holes 20a and 20b for holding in position a pair of ball bearings 23 and 24, respectively. Such ball bearings comprise load bearing and anti-friction elements.

The ball bearings 21 and 23 move between the uppermost (Figs. 1 and 2) longitudinally extending grooves 25 and 26 respectively formed in the slide elements 10 and 11. Similarly the lowermost ball bearings 22 and 24 move in the lowermost longitudinally extending grooves 27 and 28 (Fig. 1) formed in said slide elements 10 and 11, respectively.

Any suitable means may be provided for holding the pairs of balls 21, 22 and 23, 24 in place in the aforementioned grooves, the invention not being limited to the employment of the circular discs 19 and 20. However, the means for holding such pairs of balls in place are connected with the respective rivets or fastening means 16 and 17.

Referring again to Fig. 1, the longitudinally extending flanges 10a, 10b and 11a, 11b may be dispensed with. They are not essential to the maintenance of the rigidity of the extension arm because reliance for rigidifying the extension arm can be placed upon the longitudinally extending grooves formed in each slide element. Such grooves aforementioned are designated 25, 26 and 27, 28, these numbers designating their face-to-face concavities. Corresponding convex portions of such grooves are rib-like and are respectively designated 25a, 26a and 27a, 28a. The grooved regions of the slide elements thus serve the double purpose of: (a) providing channels for the bearing means, e.g. ball bearings; and (b) rigidifying the slide elements and hence the extension arm as a whole.

If desired, the end portions only of the top flanges 10a and 11a may be retained for the purpose of providing brackets by which the slide elements can be secured to relatively movable elements which the arm is designed to be associated with. Alternatively, all of the flanges can be dispensed with entirely as aforementioned and, if desired, brackets may be secured to the slide elements at suitable places, for example, at the opposite extremities as by welding.

What is claimed is:

1. An extension arm comprising in combination; a pair of duplicate side-by-side slide elements, each of said elements having a pair of longitudinally extending slots therein; a pair of fastener elements for holding together said two slide elements with said slots in side-by-side relation, each fastener element passing through its respective pair of side-by-side slots, one such slot in each of the slide elements; each of said slide elements being formed with a pair of longitudinally extending grooves parallel to each of the slots of such slide elements, one of each pair of grooves extending along one side of one of the slots of the slide element and the other groove extending along the other side of such slot, corresponding grooves of the respective slide elements forming face-to-face pairs adjacent either side respectively of each of said pairs of side-by-side slots; a first pair of anti-fraction elements interposed between said slide elements adjacent a first pair of said side-by-side slots, one of said pair of anti-friction elements being interposed between one pair of face-to-face grooves adjacent said first pair of side-by-side slots and the other of said pair of anti-friction elements being interposed between the other pair of face-to-face grooves adjacent said first pair of side-by-side slots; and a second pair of anti-friction elements similarly positioned with respect to the other pair of side-by-side slots.

2. An extension arm comprising in combination: a pair of duplicate side-by-side slide elements, each of said elements including: a longitudinally extending strip-like portion having a pair of aligned longitudinally extending slots therein, one slot formed near one extremity of the element and the other near the opposite extremity; a pair of fastener elements for holding together said two slide elements, each by passing through its respective pair of side-by-side slots, one such slot in each of the slide elements, said slots being substantially in register when the slide elements are in a retracted condition; each of said slide elements being formed with a pair of longitudinally extending grooves parallel to the slots of said slide element, one of said grooves extending along one side of the slots of the slide element and the other groove extending along the other side of such slots, corresponding grooves of said slide elements being face-to-face; a first pair of balls interposed between said slide elements adjacent a first pair of side-by-side slots, one of said pair of balls being interposed between one pair of face-to-face grooves and the other pair of such balls being interposed between the other pair of such face-to-face grooves formed in said slide elements; a second pair of spherical balls similarly positioned with respect to the other pair of side-by-side slots; and a pair of ball retaining elements, one for each of said two pairs of balls, each of said ball retaining elements being connected to its respective fastener means for holding its respective pair of balls in its coacting face-to-face grooves.

3. An extension arm comprising in combination: a pair of duplicate side-by-side slide elements, each of said elements including: a longitudinally extending strip-like portion having a pair of aligned longitudinally extending slots therein, one slot formed near one extremity of the element and the other near the opposite extremity; a pair of fastener elements for holding together said two slide elements, each by passing through its respective pair of side-by-side slots, one such slot in each of the slide elements; each of said slide elements being formed with a pair of longitudinally extending grooves parallel to such slots of said slide element, one of said grooves extending along one side of the slots of the slide element and the other groove extending along the other side of such slots, corresponding grooves of said slide elements being face-to-face; a first pair of balls interposed between said slide elements adjacent a first pair of side-by-side side slots, one of said pair of balls being interposed between one pair of face-to-face grooves and the ether of said balls being interposed between the other pair of such face-to-face grooves; a second pair of balls similarly positioned with respect to the other pair of side-by-side slots; and means for retaining said balls adjacent their respective slots.

4. An extension arm comprising in combination: a pair of duplicate slide elements situated side-by-side and face-to-face, each of such elements including: a longitudinally extending strip having formed therein longitudinally extending slot means; fastener means for holding together said two slide elements, said fastener means passing through said slot means; each of said slide elements being formed with a pair of longitudinally extending grooves parallel to such slot means, each of said grooves in cross-section comprising a concavity on one side thereof and a corresponding convexity on the opposite side thereby forming a rib extending longitudinally of the aforementioned strip thereby providing rigidifying means for the strip and the extension arm, concavities of corresponding pairs of grooves formed in said strips facing one another thereby to provide retaining channel means for ball bearings; a plurality of ball bearings positioned in said channel means; and means for retaining said ball bearings in said channel means.

5. An extension arm comprising in combination: a pair of slide elements situated side-by-side, each of said elements comprising a strip of sheet metal formed as herein defined, each of such elements defining slot means extending longitudinally thereof; fastener means for holding together said two slide elements by passing through respective of said slot means in said slide elements; each of said slide elements being formed with a pair of grooves extending longitudinally thereof parallel to the slot means of such slide element, each of said grooves comprising a longitudinally extending concavity on one side of such metal strip and a corresponding convex rib on the other side also extending longitudinally, each pair of grooves being formed in a slide element with its respective slot means situated therebetween, the longitudinally extending concavity of one such groove formed in one of such slide elements being situated in alignment with and face-to-face with the longitudinally extending concavity of the corresponding groove of the other slide element thereby to form a channel for anti-friction bearing elements; a plurality of anti-friction bearing elements positioned in such channels formed between such face-to-face concavities, said fastener means holding said slide elements against separation; and means for retaining said anti-friction bearing elements in their respective channels.

6. In an extension arm, a pair of slide elements situated side-by-side and with their longitudinal axes parallel, said slide elements comprising sheet metal strip, each slide element having a pair of rigidifying ribs formed longitudinally and along opposite longitudinal marginal portions thereof, such ribs comprising longitudinally extending concave grooves which face inwardly of the extension arm, corresponding pairs of such grooves on opposite portions of such pair of slide elements facing one another and forming channel means for anti-friction bearing elements, each of said strips defining longitudinally extending slot means, the latter being located in between and substantially parallel to the aforementioned pair of ribs formed therein; fastener means for holding said slide elements in parallel side-by-side relation, such fastener means extending through the aforementioned slot means of said slide elements, the latter slot means of said two slide elements being situated parallel to one another; anti-friction bearing elements positioned in the aforementioned channels formed by said face-to-face grooves; and means for retaining such anti-friction bearing elements in said grooves.

References Cited in the file of this patent

UNITED STATES PATENTS

| | | |
|---|---|---|
| 1,996,542 | Fox | Apr. 2, 1935 |
| 2,201,414 | Vance | May 21, 1940 |
| 2,323,604 | Hyland | July 6, 1943 |
| 2,626,195 | Walter | Jan. 20, 1953 |
| 2,649,346 | Weina et al. | Aug. 18, 1953 |